J. J. HENNESSY.
NUT LOCK.
APPLICATION FILED JAN. 12, 1918.

1,308,672.

Patented July 1, 1919.

Witnesses

Inventor
John J. Hennessy.
By Victor J. Evans
Attorney

UNITED STATES PATENT OFFICE.

JOHN J. HENNESSY, OF NEW KENSINGTON, PENNSYLVANIA.

NUT-LOCK.

1,308,672. Specification of Letters Patent. Patented July 1, 1919.

Application filed January 12, 1918. Serial No. 211,605.

*To all whom it may concern:*

Be it known that I, JOHN J. HENNESSY, a citizen of the United States, residing at New Kensington, in the county of Westmoreland and State of Pennsylvania, have invented new and useful Improvements in Nut-Locks, of which the following is a specification.

This invention relates to a nut lock and has for its primary object to provide a simple construction for effectively locking a bolt against loosening.

An object of the invention is to provide a locking device which will allow accurate adjustment of the bolt so as to allow the full tightening thereof.

Besides the above my invention is distinguished in the construction of a nut lock wherein the parts are so associated that dirt or climatic conditions will not interfere with the operation thereof and which is capable of withstanding excessive strain.

With these and other objects in view the invention will be better understood from the following detailed description taken in connection with the accompanying drawing wherein:—

Figures 1, 2:
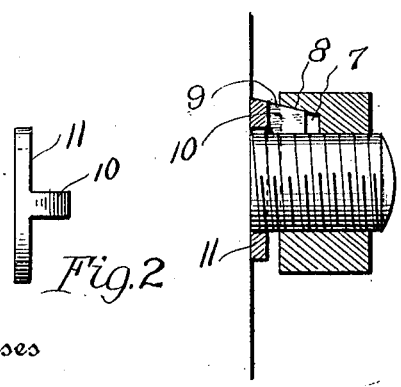
Figure 1 is a sectional view showing my device applied to a bolt.
Fig. 2 is a detail view of the washer.

My device is adapted to coöperate with an ordinary bolt 5 and the invention consists of a nut 6 threaded on the bolt and having its inner face provided with a recess 7 which has its outer wall 8 inclined as shown. Interposed between the nut 6 and the article through which the bolt 5 passes is a washer 11 having extending from the outer face thereof a tongue 10 having an inclined wall 9, this tongue being of a size and shape to conformingly engage within the recess 7.

In the use of the device, the washer 11 and nut 6 are applied to the bolt as a unit and the bolt is tightened in respect to the washer and nut by operating upon the head of the bolt. As the bolt is tightened the nut 6 is turned toward the washer 11 and the inclined walls 8 and 9 of the nut and washer, respectively, coöperate to exert a wedging action which will bind the nut firmly on the threads of the bolt.

From the foregoing description taken in connection with the accompanying drawing it should be apparent that I provide a simple construction having the proper amount of rigidity, and in which the parts are so arranged that foreign matter will not interfere with the operation thereof.

Having described my invention what I claim is:

A nut lock comprising the combination with a bolt, of a nut provided upon its inner face with a recess having its outer wall inclined, said recess communicating with the bore of the nut, a flat washer disposed upon the bolt in loose encircling relation thereto and interposed between the nut and the material through which the bolt passes, and a tongue extending outwardly from the outer face of said washer and having its outer wall inclined for coöperation with the inclined wall of said recess whereby upon rotation of said bolt with respect to said nut and washer said inclined wall will coöperate to exert a wedging action for effecting a tilting tendency on said nut whereby to cause binding of said nut with respect to said bolt, said nut and washer being non-rotatable with respect to each other.

In testimony whereof I affix my signature.

JOHN J. HENNESSY.

Copies of this patent may be obtained for five cents each, by addressing the "Commissioner of Patents, Washington, D. C."